Patented Apr. 3, 1951

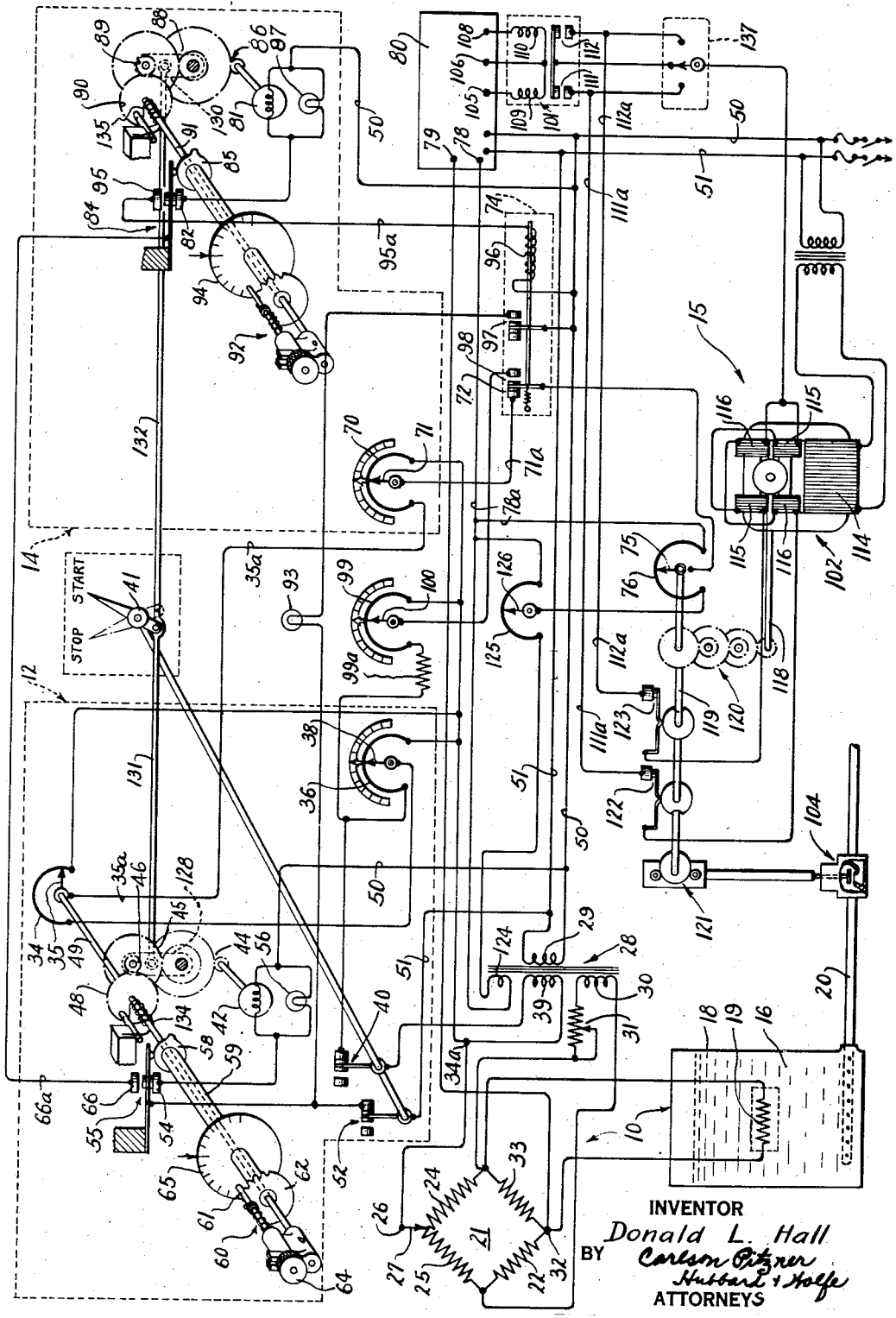

2,547,750

UNITED STATES PATENT OFFICE 2,547,750

PROGRAMMED TEMPERATURE CONTROL USING A WHEATSTONE BRIDGE

Donald L. Hall, Rockford, Ill., assignor to Barber-Colman Company, Rockford, Ill., a corporation of Illinois Application April 3, 1947, Serial No. 739,217

16 Claims. (Cl. 236—46)

1

The present invention relates to condition control devices and more particularly to a device for cooking textile size or the like by subjecting the same to a predetermined program of temperatures.

One of the objects of the invention is to provide a novel and improved device of the above character in which the temperature may not only be maintained at a desired level but in which the temperature may be brought up to such level gradually at any desired rate and in which the temperature may be subsequently reduced to a second or holding value after a predetermined time interval, all of said programming operations taking place completely automatically and without the attention of an operator.

Another object is to produce an improved condition sensitive network which gives a substantially linear output signal upon changes in the condition in spite of the use of a sensitive element having non-linear response characteristics. More specifically, an object is to produce a temperature responsive bridge circuit which, although it includes a sensitive type resistance element having a varying temperature coefficient of resistance, produces a substantially linear output signal, enabling an auxiliary control or neutralizing potential to be derived from a plurality of linearly calibrated potentiometers and independently of the existing temperature.

A further object is to provide an improved condition controlling device including a Wheatstone bridge circuit having a condition responsive element therein and in which the circuit adjustments for shifting the control or set point are effected externally and independently of the bridge circuit.

Still another object is to provide a temperature control device for gradually changing the temperature upon passage of time and in which the temperature existing at the end of the time interval is separately adjusted and independent of the rate of temperature change during such interval.

Another object is to provide a program type temperature control including constant speed drives for causing timed advancement of control elements and in which novel and improved means are provided for causing automatic restoration of such drives to their initial condition upon completion of the temperature cycle and in preparation for a succeeding cycle.

Other objects and advantages of the invention will become apparent from the following detailed description taken in connection with the accompanying drawing which constitutes a schematic showing of a temperature controlling device constructed in accordance with my invention.

The invention is applicable to the controlled programming of conditions in connection with a wide variety of industrial processes. For purposes of ready understanding the invention has been shown in the drawing and described in detail herein as embodied in an apparatus for the cooking of sizing liquid or the like. Although this typifies the many uses to which the invention may be put, it is to be understood that I do not intend to limit the invention by such disclosure but aim to cover all modifications and alternative constructions and uses falling within the spirit and scope of the invention as expressed in the appended claims.

As a convenience in discussion, the circuit shown in the drawing may be divided into four portions, which, although cooperating with one another to produce a novel and improved result, have individual advantageous features enabling their use outside of the environment shown. The first of these portions, and that which is responsive to the condition being controlled, is the input network indicated generally by the numeral 10. The second portion of the device, which produces a time-varied control potential, here employed for controlling the warmup time, is indicated at 12. A third portion, utilized for maintaining the condition constant for a predetermined interval, is indicated at 14. The latter is effective to maintain cooking temperature constant over a predetermined period of time and then to change it to a holding value. After the various control potentials have been combined with the potential derived from the input network 10 to produce a resultant potential, the latter is fed into a condition adjusting portion 15 of the apparatus (shown along the lower edge of the drawing) and which is here utilized to control the application of steam or other heating medium.

Input resistor network

Referring more particularly to the input network 10 it will be seen that the size 16, the temperature of which is to be controlled, is contained in a vat or kettle 18 in which is located a temperature responsive resistor 19. The temperature of the size 16 is, in the present instance, correctively raised by bubbling live steam therethrough which is admitted through a supply line 20. It will be noted that the temperature responsive resistor 19 is included in one leg of a Wheatstone bridge 21 having an adjacent leg 22 and complementary legs 24, 25 respectively. The latter two legs are jointly connected to an output terminal 26 via an adjustable slider 27.

To impress an exciting voltage on the Wheatstone bridge 21, a transformer 28 is employed having a primary winding 29 and a secondary winding 30, the latter being connected to the bridge input terminals through a voltage adjusting rheostat 31. Departure of the temperature responsive resistor 19 from a given resistance value will cause the voltage between the output terminal 26 and a second output terminal 32 to change in magnitude. It is, of course, desirable for control purposes that a change in temperature be reflected as an appreciable change in the output voltage of the bridge. To this end, I prefer to use a resistor 19 composed of resistance material having an appreciable negative coefficient of resistance. Although many types of resistance materials are commercially available for this purpose, it is my observation that those best suited have a generally hyperbolic resistance-temperature curve. It has been found that resistors well suited for use in the temperature range of 50 to 220 degrees F. have a resistance-temperature characteristic approximately as follows:

*Typical temperature-responsive resistance element*

| Temperature, Degrees F. | Resistance, Ohms |
|---|---|
| 50 | 117,000 |
| 60 | 94,000 |
| 80 | 66,500 |
| 100 | 49,000 |
| 120 | 37,000 |
| 140 | 27,500 |
| 160 | 21,000 |
| 180 | 16,000 |
| 200 | 13,000 |
| 220 | 10,000 |

One of the drawbacks normally experienced in using temperature responsive resistance materials of the above type in Wheatstone bridge circuits, is the fact that the response of the bridge is not linear but varies with temperature. Stated another way, the change in bridge output voltage produced per degree of temperature is considerably different at one point on the temperature scale than it is at another. If the temperature is merely to be maintained at a single preset value, the latter is not objectionable since, under such circumstances, operation normally takes place over but a small section of the characteristic curve. Where the temperature must be controllably increased through a wide range as is required in the gradual programmed heating of sizing material, the non-linear response curve is normally disadvantageous since special control potentiometers must be used having non-linear characteristics which exactly complement the non-linear characteristics of the temperature responsive element. Even where complementary non-linear components are used, difficulty is still encountered in all instances in which several sources of control potential are to be used jointly. The reason for the latter is that the calibration of each non-linear potential source is affected by the adjustment of potential sources in series with it. The resulting interdependence of the sources of control potential has not only discouraged the use of recently developed non-linear resistors but has made it necessary to resort to more complicated and expensive control arrangements for obtaining the desired high order of accuracy.

In accordance with one of the aspects of the invention, improved compensating means are included in the bridge circuit 21 so that the output voltage is a linear reflection of the temperature to which the resistor 19 is subjected throughout its entire range. In the present instance the compensating element takes the form of a shunt or compensating resistor 33 which is connected in parallel with the temperature-responsive resistor 19. The resistance value of the compensating resistor and of the adjacent resistor 22 required for linear output may be determined by one skilled in the art either rigorously or experimentally or by a combination of the two methods. With regard to the rigorous approach, the observed characteristic curve of the temperature-responsive resistor 19 may be converted into a mathematical expression relating temperature and resistance. This expression may then be incorporated into a mathematical equation which includes the resistances 22, 33 in the bridge as parameters. The latter equation may then be solved for the condition which will cause the derivative or slope (with respect to temperature) of the output characteristic curve to be a constant. After the circuit parameters are determined approximately, they may, if desired, be refined in accuracy by a trial and adjustment process using a bench setup.

By application of a technique of the foregoing type to a temperature-responsive resistor having the characteristics tabulated above, it was found that a linear bridge output characteristic could be obtained by using a fixed compensating resistor 33 of 44,000 ohms and a fixed resistor of 30,000 ohms for the resistor 22 in the adjacent leg of the bridge. Since temperature responsive resistors having characteristics of the same general form are readily available from commercial sources, the resistances above given for resistors 33 and 22 will serve as a guide in compensating other temperature responsive resistors.

The adjustment of the slider 27 may be set to correspond to a zero or predetermined output at some low temperature, for example, room temperature and thereafter does not require frequent adjustment. Likewise the rheostat 31, once set to give the desired magnitude of bridge output voltage need not be reset. The latter is true even in spite of relatively large changes in line voltage which have been found to have substantially no effect on the accuracy of control.

Because the input resistor network thus far described produces an output voltage which is linear with respect to the temperature being measured, it will be apparent to one skilled in the art that such network has, of itself, considerable general utility. Thus, a voltmeter or recorder may be applied to the output terminals and readily calibrated in terms of temperature on a "degrees per volt" basis and without using any special scale. For present purposes, however, the output voltage of the bridge is utilized for the corrective adjustment of the temperature, a control potential for determining the temperature setting being preferably derived and applied externally to the bridge in a manner to be covered in the following sections.

*Warmup timing control*

In order to bring the controlled condition up gradually to a desired sustained value, it is necessary to provide a circuit adjustment or to insert a control voltage which changes gradually with respect to time. Conventionally, variation with respect to time has been accomplished by a timed adjustment of one of the resistors of the bridge circuit so that the bridge is caused to rebalance at a new point. The latter has been fairly satisfactory in those cases where a single unbalancing resistor is used or in which operation takes place over a very narrow range of the bridge output characteristic. In accordance with the present invention, however, a plurality of control voltages are derived and the algebraic sum thereof is applied in series with the bridge output circuit externally and independently of the bridge. In accomplishing the latter, the bridge is not operated at a null or balance point, as is the case in more conventional arrangements but on the contrary may be operated at any point along its voltage output curve. The advantages derived from this arrangement will be more fully appreciated upon inspection of the specific means here used for producing the warmup control voltage.

Referring more particularly to the warmup timing control 12 in the drawing it will be seen that it includes a warmup potentiometer 34 having a slider 35, such potentiometer being in series with a so-called compensating rheostat 36 having a slider 38. The purpose of the rheostat will be understood as the discussion proceeds, and attention may be given primarily to the warmup potentiometer 34. Both the potentiometer and the compensating rheostat are in series with a source of alternating voltage derived from a secondary winding 39 of the transformer 28, the circuit being completed through a manually operated switch 40 which is closed during the normal operation of the device and upon movement of the start-stop control knob 41 to the "start" position. During normal operation, then, a current circulates through the elements 34, 36 producing a voltage drop therein, a portion of such voltage drop being "tapped-off" by means of the potentiometer slider 35. It is the latter voltage which is applied to an output lead 35a (near the center of the drawing) and which constitutes the warmup signal. That the warmup signal is applied in series relation to the output signal of the bridge 21 will be apparent by noting that a connection 34a connects the bridge output terminal 26 to one side of the warmup potentiometer 34. Thus, the warmup signal appearing on the line 35a is the result of the voltage drop in the right-hand leg of the potentiometer 34.

In accordance with the invention means are provided for driving the potentiometer slider 35 at a timed rate to thereby vary the warmup signal at a timed rate and consequently to change the temperature maintained in the vat 18 as a function of time. As here shown the potentiometer slider 35 is advanced by means of a synchronous motor 42 which is of the conventional clock type, the latter acting through gears 44, 45, 46 and 48, and coupled to the potentiometer slider 35 through a shaft 49. Current is supplied to the motor 42 through an A. C. supply lead 50 and a second A. C. supply lead 51. In series with the lead 51 is a switch 52 which is closed (by control knob 41) during the time that the device is in use. Also in series is one side 54 of a single pole double throw transfer switch 55, the latter being in the closed position as shown during the warmup period. It may be noted that an indicator lamp 56 is in parallel with the driving motor 42 in order to give an external indication that the control device as a whole is in the warmup part of the programed cycle. Since specific treating liquids such as size require widely varying warmup periods, it is desirable to provide means for controlling the duration thereof. In accordance with one aspect of the invention therefore, means are provided which are rotatable with the potentiometer slider 35 for terminating the advancement of the slider, in other words, for preventing the warmup control potential from increasing beyond a predetermined point. The latter is accomplished by the use of a switch operator or cam 58 which is adjustably positionable on the shaft 49. Such positioning is effected by mounting the cam 58 on a sleeve 59 which carries at its forward end a detent type locking arrangement 60. The detent itself consists of an inwardly spring biased plunger 61 which cooperates with a selected notch in the periphery of a notched disk 62, the plunger 61 being withdrawn for relative sleeve rotation by means of a knob 64. In order to indicate the amount of time which will elapse prior to operation of the switch 55 by the rotation cam 58, an indicating dial 65 is mounted on the sleeve 59 and movable in unison with the cam 58.

It will be apparent with the warmup control in the condition shown that rotation of the driving motor 42 may be employed to drive the potentiometer slider 35 in a counterclockwise direction. At the beginning of such movement, that is, with the potentiometer slider 35 at the right-hand end of the potentiometer 34 no voltage will be applied to the output lead 35a, the reason for the latter being, as previously noted, that the voltage on the lead 35a is dependent upon the voltage drop in the right-hand leg of the potentiometer 34. As the interval progresses, the voltage drop in the right-hand leg of the potentiometer 34 increases, thus increasing the voltage at the output lead 35a proportionally with time. A point will be reached, however, in the rotation of the potentiometer slider 35 at which the cam 58 is effective to operate the switch 55. The latter switch, preferably of the snap action type, causes contact to be broken at 54 and completed at an opposite contact 66. One effect of the latter is to break the circuit of motor 42 causing the slider 35 to come to rest and a sustained voltage to exist on the output lead 35a. A second effect is to cause line voltage to be applied to a lead 66a for initiating operation of the cooking portion of the control 14 to be described in the following section.

It is desirable that the warmup time adjustment (set on the dial 65) produce a control signal which is proportional to the elapsed time and which enables other control signals to be set independently. In accordance with one of the aspects of the invention therefore means are provided for causing the output signal of the warmup portion of the device (which appears on lead 35a) to increase gradually to the same predetermined reference potential at the end of the warmup period regardless of the warmup time interval for which the device has been adjusted. This enables serial addition of other control signals to produce a resultant control potential which is predeterminable and independent of the warmup time. In effecting the latter the compensating rheostat 36, in series with the potentiometer 34, serves to adjust the total potential drop appearing across the potentiometer to a new value for each setting of warmup time.

The manner in which such compensation is effected may be more completely appreciated by noting the manner in which the settings of the rheostat slider 38 are originally determined. It will be assumed, for example, that reference potential of .1 of a volt is desired at the lead 35a at the termination of the warmup period. Since the reference potential must be produced at the lead 35a with the device adjusted to the maximum warmup time condition (say 90 minutes), the compensating rheostat 36 is initially adjusted to cause the total potential drop across the potentiometer element 34 to be .1 of a volt. This setting of the rheostat will always be used under conditions of maximum warmup time and may be calibrated by marking it accordingly. Suppose, however, that the desired warmup time is just half of the maximum, say 45 minutes. During such period the constant speed motor 42 will be effective to drive the potentiometer slider 35 through only half its range, in other words, to the mid point. Without compensation this would correspond to a potential at the lead 35a of only .05 volt or half of the necessary potential. The latter may, however, be corrected by preadjustment of the compensating rheostat 36 to a new setting which will cause the total voltage across the potentiometer 34 to be doubled. Desirably, the potential existing at the mid point corresponding to 45 minutes warmup time will then be .1 of a volt. Since the compensating rheostat will be set in such position whenever this warmup period is used, the setting may be calibrated by marking it in terms of the time interval, namely, 45 minutes. Thus, for each time setting of the dial 65 there will be a corresponding setting for the compensating rheostat 36, and the effect of the latter in each case is to cause the total voltage drop across the potentiometer 34 to be such that the output potential on the slider 35 will be at its reference value at the end of the timed warmup period.

For purposes of mechanical simplicity and ready understanding, the compensating rheostat 36 has been shown separated from the shaft 49 which drives the warmup potentiometer. Thus, when readjusting the warmup period it is necessary to set two controls, the dial 65 and the slider 38 of the compensating rheostat. Since both of the latter adjustments are preferably a linear function of the desired time interval, they are therefore linearly related. It will thus be apparent to one skilled in the art therefore that my invention is not limited to two separate adjustments as described above but obviously includes the concept of making such adjustments with a single control, namely the dial 65. To accomplish the latter it is sufficient merely to cause the angular displacement between the shaft 49 and the switch cam 59 to cause a corresponding displacement between the compensating rheostat element 36 and its slider 38. To that end the rheostat element 36 may be mounted on and pinned to the shaft 49 while its slider 38 is mounted on the control cam 58 for rotation therewith. The primary disadvantage of the latter arrangement is the fact that the body of the compensating rheostat 36 must be rotatable through a considerable angle thus requiring the use of slip rings or rather lengthy pigtails, either of which would require considerable maintenance for successful operation.

Cooking time control

At the end of the warmup cycle, operation of the switch 55 causes line voltage to be applied to the timing apparatus included in the cooking time control 14 via the lead 66a. The portion 14 of the device, in addition to including timing components, also includes means for determining the cooking temperature and to which reference will first be made. In order to adjust such cooking temperature, a potentiometer 70 is used, having an adjustable slider 71 thereon. It will be noted that the potentiometer 70 is connected at its right-hand end to the terminal 34a which, in turn, is connected to the output terminal 26 of the bridge 21, while the remaining or left-hand terminal of the potentiometer 70 is supplied with potential from the line 35a which leads from the warmup timing control 12 discussed above. The voltage at the output lead 71a of the cooking control 14, and which is connected to the slider 71, is therefore dependent upon two factors: The first is the existing potential in the supply lead 35a, the latter being at a constant or reference value (e. g. .1 volt) upon termination of the warmup period, while the second and governing factor is the setting of the slider 71. It will be apparent therefore that in order to maintain a given cooking temperature it will be sufficient merely to calibrate the potentiometer 70 in terms of temperature. Such calibration may be readily accomplished initially by observing the temperature of the cooking vat 18 and making a corresponding indicating mark opposite the then setting of the potentiometer slider 71.

In order to apply the control potential existing at the output lead 71a to the temperature adjusting means 15, the circuit is completed through a pair of normally closed contacts 72 of a transfer relay 74, the purpose of which will be clear as the discussion proceeds. From the contacts 72 potential is applied to the slider 75 of a proportioning potentiometer 76, the purpose of which may also be disregarded for the moment. From the potentiometer 76 the control voltage is applied, via a lead 78a to an input terminal 78 of an amplifier 80. The other amplifier input terminal, 79, is supplied directly from the terminal 32 of the bridge.

The control voltage derived from the cooking potentiometer 70 will persist at a constant value and will hold the temperature constant over a desired time interval. In accordance with my invention a motor driven timer similar to that previously described is used for maintaining a "cooking" control potential over an exactly predetermined cooking interval. Thus, there is provided a constant speed timing motor 81 which is energized by the supply lead 59 and by a second supply lead 66a from the warmup timing control 12. Connection of the motor 81 to the latter lead is effected through contacts 82 of a single pole double throw transfer switch 84 and which is normally in the position shown. This switch is operated by a switch operating member or cam 85 which rotates gradually into the operating position upon the passage of time. Rotation of the member 85 is produced by the timing motor 81 via gears 86, 88, 89 and 90, and the shaft 91.

It will be apparent that the timing interval which exists before the operation of the switch 84 will depend upon the adjusted angular displacement between the switch operating cam 85 and the shaft 91 which drives it. The latter two elements may be angularly offset by means of a detent type locking adjustment 92, the amount of offset being indicated on a dial scale 94 which rotates in unison with the switch operating member 85, all as previously discussed in detail in connection with portion 12 of the apparatus. Due to the fact that the cooking time is normally greater than the warmup time, the step down ratio of the gears 38, 89 will be greater than in the case of gears 44, 48. In order to inform an operator that the control device is in the cooking phase, an appropriate indicator lamp 87 is arranged in parallel with the timing motor 81.

Upon expiration of the preadjusted cooking period, the cam 85 will cause the switch 84 to be snapped upwardly into contact with an upper contact 95. The latter results in the deenergizing of the timing motor 81 and the application of voltage to a relay control lead 95a associated with the contacts 95. This causes voltage to be applied to the winding 96 of the transfer relay 74. The effect of relay operation is to cause contacts 72 to be broken, thereby disabling the cooking potentiometer 70 and to cause the making of contacts 98, thereby to apply a different control potential to the temperature adjusting portion of the device. Energizing relay 74 also causes the making of contacts 97 and the lighting of an indicator lamp 93.

At this point it will be helpful to observe the means used for applying what may be termed "holding" potential through the contacts 98. The magnitude of such potential may be preadjusted by adjustment of a holding potentiometer 99 having a slider 100 thereon. The right-hand end of the potentiometer 99 is connected to terminal 34a leading to the Wheatstone bridge 21 while the left-hand end is connected through resistor 99a and contacts 40 to one side of the secondary winding 39. It will be apparent therefore that a constant current is circulated through the potentiometer 99 by the transformer winding 39, producing a definite potential drop in the potentiometer. A portion of such potential drop may be adjustably tapped off by means of the slider 100, and it is the tapped-off portion which is fed to the contacts 98, thence to the temperature adjusting means. As in the case of the cooking potentiometer 70, the holding potentiometer 99 may be calibrated in terms of the temperature which it is desired that the control apparatus shall "hold" in the vat 18 after the cooking period and which is generally lower than the cooking temperature. While the holding temperature is maintained for an indefinite period, it will be apparent that the invention is not thus limited but includes arrangements in which the holding temperature is maintained for a timed interval as in portions 12 and 14. Normally, however, the source of heat will be manually turned off by movement of the manual control knob 41 to the "stop" position which, due to the opening of contacts 40, removes control voltage completely.

*Temperature adjusting portion*

The temperature adjusting portion of the device, in other words, those components which are acted upon by the control signals and which correctively change the temperature of the vat or kettle, are shown along the lower edge of the drawing. While my invention is not limited to any specific manner of utilizing the control voltages developed by the other portions of the apparatus, I prefer to use an amplifier 89, a sensitive motor control relay 101, and a driving motor 102, the latter serving to correctively open or close a steam control valve 104.

The amplifier may be of any well known type having phase-sensitive characteristics, it being understood that the amplifier will be supplied from the same supply lines 50, 51 in which the control or input signal originates. As is conventional, the amplifier is provided with three output terminals 105, 106, 108 the terminals 105 and 108 being connected respectively to windings 109, 110 of the sensitive relay 101. Thus, departure of the input signal from the null value in one direction will cause closure of contacts 111 of the relay while departure in the opposite direction will cause closure of contacts 112. The latter causes the motor control circuit to be completed through lead 111a or, alternatively, through lead 112a. It may be said at this point that the motor 102 is of a well known A. C. reversible type having a main winding 114 and control windings arranged in diagonal pairs and designated 115 and 116, respectively. The shaft 118 of the motor 102 is connected to a valve operating shaft 119 via a gear train 120. Rotation of the latter shaft may be transmitted to the valve 104 by means of a cam drive 121 or the like.

The motor 102 will, of course, rotate in one direction or the other as one or the other of the sets of control windings is energized, the circuit being broken at the respective ends or limits of travel by appropriate limit switches 122, 123 in series with the leads 111a, 112a, respectively.

Since the changing of temperature in the vat 18 does not occur instantaneously with a change of the heat applied thereto, it is necessary to provide means for deriving a proportioning signal. Such a signal varies with the displacement of the valve operator from a mean position and is in the opposite sense with respect to the signal which has caused the movement of the valve control from its mean position. To this end, the slider 75 of the proportioning potentiometer 76 is rotatively coupled to the valve controlling shaft 119. The proportioning potentiometer is supplied with a circulating current from a separate secondary winding 124 on the transformer 28. The magnitude of the proportioning effect is regulated by adjusting the total potential drop across the potentiometer 76, the latter being accomplished by means of a throttling range potentiometer 125 having a slider 126 thereon which serves to tap off any desired amount of potential for application to the potentiometer 76.

After the control device has completed its cycle and has been shut off, it is necessary to restore the drive associated with the timing motors 42 and 81 to their initial condition preparatory to a succeeding cycle. In accordance with one of the more detailed aspects of the invention, therefore, means are provided for uncoupling the timing motor and for restoring the driven shafts 49, 91 to a reference position, all as a result of moving the manual control knob 41 to the "stop" position. In the instant embodiment the latter is accomplished by mounting the gears 46, 89 on swingable arms designated 128, 130 and controlled by push rods 131, 132. After disengagement of the gear trains by the push rods, the shafts 49, 91 are then free to rotate in a clockwise direction to their initial positions under the biasing influence of coil springs 134, 135. While it is true that the gear trains remain disengaged under "off" conditions, movement of the manual control knob 41 to the "start" position is effective to recouple the timing motors to their respective driven shafts 49 and 91.

If desired for test or other purposes, the operation of the valve 104 may be manually controlled in one direction or the other by means of a single pole double throw switch 137, which, in effect by-passes the contacts of the sensitive relay 101.

Resumé of operation

While the operation of the control device will, for the most part, be apparent from the foregoing discussion it will be helpful to summarize it briefly. To set up the program of temperatures the following manual adjustments are made, it being assumed that bridge adjustments 27, 31 remain the same and that the throttling range is adjusted to a point which will not cause overshooting of the temperature:

(a) The desired warmup time is set on the dial 65 and also on the calibrated scale associated with the compensating rheostat 36.

(b) The cooking temperature is set on the scale associated with the cooking potentiometer 70.

(c) The cooking time is set on the dial 94.

(d) The holding temperature is set on the scale associated with the holding potentiometer 99.

The manual control lever 41 is next moved to the "start" position, the latter being effective to energize the warmup timing motor 42. The resulting movement of the slider 35 causes a progressively increased control potential to exist at the lead 35a and therefore at the amplifier input terminal 78. This causes closure of the sensitive relay 101, rotation of the driving motor 102, and additional opening of the inlet valve 104. The resulting increase in temperature in the vat 18 causes the temperature responsive resistor 19 to suffer a change in resistance. Change in resistance of resistor 19 is reflected in a corresponding change in bridge output potential across the terminals 32, 26, the latter being in a direction to neutralize the control potential originating in the warmup potentiometer 34 and which initiated the temperature change.

As the voltage at the lead 35a and produced by the warmup timing control is further increased, additional heat is applied to the vat so that there is a further change in the resistance of element 19 and a further change in output potential of the bridge. Thus, the bridge potential again serves to neutralize the increased control potential, tending to restore the system to balance. While the temperature may be considered to be controllably increased in a series of finite steps, as above, the temperature is actually found to increase to the cooking temperature at a gradual rate and linearly with respect to time.

Upon operation of the switch 55, the warmup period is terminated and the cooking period initiated. The temperature at which the vat 18 is maintained is determined by the setting of the cooking potentiometer 70 and the cooking time by the interval which exists prior to the operation of the switch 84. Upon operation of the latter switch, the transfer relay 74 disables the cooking potentiometer and transfers control to the holding potentiometer 99 which maintains the temperature at the holding value until the manual control knob 41 is moved to the "stop" position.

It will be apparent to one skilled in the art that my invention is by no means limited to the controlling of the cooking of textile size. The temperature of treating chambers and the like used in various other industrial processes may be controlled with equal facility. In addition, other conditions than temperature may be controlled, for example pressure or displacement, merely by subjecting the temperature responsive resistor 19 to an auxiliary heater energized in accordance with variations in the condition to be controlled. It is also possible, without departing from certain aspects of the invention, to substitute other types of bridges than that employed, for example a bridge including capacitive or inductive reactance and in which the reactance is varied in accordance with the controlled condition, although it will be understood that the linearity of the output signal of the bridge disclosed herein causes the present arrangement to be preferred.

In the following claims, the term "fixed resistor" includes resistors whose resistance remains unchanged during normal operation of the device even though such resistors may include provision for adjusting the same to the correct initial value for purposes of calibration and the like.

I claim as my invention:

1. In a device for varying a condition as a function of time, the combination comprising a Wheatstone bridge having input and output terminals, a condition responsive resistor in one of the legs of said bridge, auxiliary impedance means associated with said condition responsive resistor for causing the potential at the bridge output terminals to vary substantially linearly with the condition, a potentiometer having input terminals and output terminals, said input terminals having a potential source connected thereto, constant speed means for driving said potentiometer to vary the potential at the output terminals thereof, means for adjustably limiting the range of movement of the potentiometer, means for correctively adjusting the potential at the input terminals of said potentiometer so that the potential at the output terminals of the latter varies through the same range regardless of the range to which said potentiometer has been adjustably limited, and means responsive to the algebraic resultant of the potentials at said output terminals for correctively varying said condition upon departure of said resultant potential from a predetermined value.

2. In a control system the combination comprising means responsive to a variable potential for correspondingly changing a condition, a first potential source for applying control potential to said responsive means, said first potential source including a rotatable shaft, a time-synchronized motor for rotating said shaft, and means including a potentiometer coupled to said shaft for producing control potential which changes at a timed rate as said shaft is advanced, a second potential source, and means including an electric switch operated upon rotation of said shaft through a predetermined angle for not only deenergizing said motor but for transferring control of said responsive means to said second potential source.

3. In a device for controlling a condition, a Wheatstone bridge having input and output terminals, a source of potential connected to said input terminals, said bridge including a condition responsive resistor in one of the legs thereof, said condition responsive resistor having a relatively large negative coefficient of resistance at the high resistance end of its normal temperature range and a progressively smaller coefficient throughout the remainder of the range, means including an auxiliary resistor in parallel with said condition responsive resistor, the resistance of said auxiliary resistor means being so chosen with respect to the resistance characteristic of said condition responsive resistor and with respect to the remainder of the resistors in said bridge that a potential is produced at the bridge output terminals which varies substantially linearly with said condition, an auxiliary source of potential connected in series with said bridge output terminals, means including a movable control element for varying the potential of said auxiliary source linearly with the movement of said element, means responsive to the alegebraic resultant of the potentials produced by said bridge and by said auxiliary source for causing said condition to be correctively changed in one direction or the other depending upon whether said resultant is on one side or the other of a predetermined balance value, the linearly variable nature of the output potentials of said bridge and of said auxiliary source causing the maintained condition to change linearly with the movement of said movable control element.

4. In a device for producing an adjustably predetermined temperature condition, the combination of a bridge circuit having a source of energizing voltage, a temperature responsive resistor having a non-linear temperature coefficient, a compensating resistor in parallel with said temperature responsive resistor, said compensating resistor and the resistor in the adjacent leg of said bridge having fixed values so chosen that the output voltage of the bridge varies linearly with changes in said condition, a plurality of sources of auxiliary potential external to said bridge and including means for adjustably varying each of them, means combining the potentials produced by said bridge and said auxiliary voltage sources to produce a resultant, means for correctively varying the temperature upon departure of said resultant potential from a predetermined value, the supplying of auxiliary potentials externally to said bridge causing the linear response characteristic of the latter to be maintained completely independently of the adjustment of individual ones of said auxiliary potential sources.

5. In a condition control system, means for producing control potential for application to a condition changing device, first and second control shafts, first and second time-synchronized motors for driving said shafts respectively, means responsive to the rotation of said shafts for controlling the application of control potential to said condition changing device, switch means associated with said first shaft for stopping said first motor and for starting said second motor upon advancement of said first shaft through an adjustably predetermined angle, means associated with said second shaft for stopping said second motor upon advancement of the latter shaft through an adjustably predetermined angle, spring return means for said shafts respectively, and common means for uncoupling said shafts from their respective motors at the end of the controlled period to enable said spring return means to restore said shafts to their initial positions.

6. In a program type temperature control, means for changing the temperature corresponding to changes in a control potential, a source of control potential for said temperature changing means, means including a motor driven electric control device for gradually changing said control potential to an adjustably predetermined first magnitude and in an adjustably predetermined warmup period, means including a second motor driven electric control device for maintaining the potential at said first magnitude for an adjustably predetermined cooking period, and means including an electric control device operated as an incident to the expiration of said cooking period for changing said control potential to an adjustably predetermined second magnitude corresponding to a maintained holding temperature.

7. In a program type temperature control, a Wheatstone bridge having a source of exciting voltage and including a temperature responsive resistor for producing a bridge output potential which varies with temperature, a source of control potential, means for correctively changing the temperature in accordance with the difference between said bridge potential and said control potential, means including a motor driven electric control device for gradually changing said control potential to an adjustably predetermined first magnitude and in an adjustably predetermined warmup period, means including a second motor driven electric control device for maintaining the potential at said first magnitude for an adjustably predetermined cooking period, and means including an electric control device operated as an incident to the expiration of said cooking period for changing said control potential to an adjustably predetermined second magnitude corresponding to a maintained holding temperature.

8. In a program type temperature control device for controlling the temperature of a medium, a Wheatstone bridge having a source of exciting voltage therefor, means including a temperature responsive resistor in said bridge for producing a bridge output voltage which varies directly with the temperature of the medium, means including a source of control potential independent of said bridge for combining with the potential derived from said bridge to produce a resultant potential, means responsive to the departure of said resultant potential from zero for correctively raising or lowering the temperature of the medium, first and second driving motors, means including a potentiometer driven by said first driving motor for gradually varying said control potential during a preadjusted warmup period to a first potential setting, means for adjustably predetermining the magnitude of said first setting to provide a desired cooking temperature, means including a switch and operated by said first driving motor at the end of said warmup period for causing said first driving motor to be deenergized and said second driving motor to be energized, and means including a switch operated by said second driving motor after a preadjusted cooking period for changing said control potential to a second setting corresponding to a holding temperature, and means for adjustably predetermining the magnitude of said second setting to obtain a desired holding temperature.

9. In a temperature control device, the subcombination comprising a bridge of the Wheatstone type, one of the legs of said bridge having a temperature-responsive resistor shunted by a shunt resistor and the adjacent leg having a fixed resistor, a source of reference potential connected in series with the output terminals of the bridge, means including a movable element for adjusting the magnitude of the reference potential linearly with the movement thereof, said temperature-responsive resistor having a resistance which varies generally hyperbolically with temperature and the resistances of said shunt resistor and said fixed resistor being so chosen with respect thereto that the output voltage of the bridge is a substantially linear function of the temperature to which the temperature-responsive resistor is subjected, and means responsive to departure of the resultant potential from a null condition for correctively changing the temperature and hence the output of the bridge to restore the null condition.

10. In a temperature control device, the subcombination comprising a bridge of the Wheatstone type, one of the legs of said bridge having a temperature-responsive resistor shunted by a shunt resistor and the adjacent leg having a fixed resistor, means including a linear potentiometer having a wiper for supplying a variable reference potential in series with the potential across the output terminals of the bridge, means responsive to a departure of the net potential from a null condition for correctively changing the temperature and hence the output of the bridge to restore said null condition, said temperature-responsive resistor having a resistance which varies generally hyperbolically with temperature and the resistances of said shunt resistor and fixed resistor being so chosen with respect thereto as to produce a bridge output voltage which is a substantially linear function of the temperature to which the temperature-responsive resistor is subjected, and a timer mechanism for causing relative rotation of the wiper of said potentiometer at a uniform rate to produce a uniform rate of increase of the temperature.

11. In a temperature control device, the subcombination comprising a bridge of the Wheatstone type, one of the legs of said bridge having a temperature-responsive resistor shunted by a shunt resistor and the adjacent leg having a fixed resistor, means including a linear potentiometer having a wiper for supplying a variable reference potential in series with the potential existing across the output terminals of the bridge, means responsive to a departure of the net potential from a null condition for correctively changing the temperature and hence the output of the bridge to restore said null condition, said temperature-responsive resistor having a resistance which varies generally hyperbolically with temperature and the resistances of said shunt resistor and said fixed resistor being so chosen with respect thereto as to produce a bridge output voltage which is a substantially linear function of the temperature to which the temperature-responsive resistor is subjected, a timer mechanism for causing relative rotation of the wiper of said potentiometer at a uniform rate to produce a uniform rate of increase of the temperature, means for adjustably limiting rotation of the wiper of said potentiometer, and means for correspondingly increasing the potential gradient across said potentiometer to increase the rate of temperature change.

12. In an automatic temperature control device, the subcombination which comprises a bridge circuit of the Wheatstone type having four legs and a pair of output terminals, one of said legs including a temperature-responsive resistor having a shunt resistor in parallel therewith and the adjacent leg having a fixed resistor, said temperature-responsive resistor having a variable temperature coefficient of resistance with a temperature-resistance curve which is substantially hyperbolic in form and the resistances of said shunt resistor and said fixed resistor being so chosen with respect thereto that the voltage appearing at the output terminals of said bridge bears a linear relation to the temperature to which the temperature-responsive resistor is subjected, heat control means including input terminals for correctively increasing and decreasing the supplying of heat to said temperature-responsive resistor depending upon the variation from a null value of the potential supplied thereto, and means including an auxiliary source of reference potential in series with the output terminals of said bridge and the input terminals of said heat control means and independent of the resistors in said legs for predetermining the temperature control point, said auxiliary source of potential including a linearly variable potentiometer for changing the control point linearly with the adjusting movement thereof.

13. In a temperature-responsive device, the subcombination which comprises a bridge circuit of the Wheatstone type having four legs and a pair of output terminals, all of said legs having resistors which are constant in magnitude during all conditions of operation, a temperature-responsive resistor in parallel with one of said legs, said temperature-responsive resistor having a high negative temperature coefficient of resistance producing a temperature-resistance characteristic which is generally hyperbolic in form and the bridge resistors which are in parallel and in series respectively with said temperature-responsive resistor being so chosen that the voltage appearing at the output terminals of said bridge bears a linear relation to the temperature to which the temperature-responsive resistor is subjected, means external to said bridge and connected in series with the output terminals thereof for supplying a linearly variable reference voltage, and means responsive to the discrepancy between the bridge output voltage and the reference voltage for correctively varying the temperature to reduce the discrepancy to zero so that a predetermined temperature is maintained for each condition of adjustment of said reference voltage and independent of the condition of unbalance in said bridge.

14. In a temperature control device, the combination comprising a bridge circuit of the Wheatstone type, said bridge circuit having in one of its legs a shunt resistor and a temperature-responsive resistor connected in parallel and having a fixed resistor in the adjacent leg, said temperature-responsive resistor having a high negative temperature coefficient of resistance with a temperature-resistance characteristic which is generally hyperbolic in form and said shunt and fixed resistors being so chosen with respect thereto that the voltage existing across the output terminals of the bridge varies substantially linearly with the temperature to which the temperature-responsive resistor is subjected, means including a first potentiometer connected in series with the output terminals of the bridge, said potentiometer having a shaft and being so constructed and arranged that the output voltage thereof varies linearly with the rotation of the shaft, means including a second potentiometer electrically connected to said first potentiometer to vary the voltage range of the latter, and means including a relay responsive to the net voltage of the bridge and the potentiometers for causing a change in the temperature in such direction as to restore the voltage across the relay to zero and thereby cause the temperature to be maintained at a value determined by the existing setting of said potentiometer.

15. In a device for controlling temperature the combination comprising a bridge circuit of the Wheatstone type having four legs and a pair of output terminals, one of said legs including a temperature-responsive resistor having a shunt resistor in parallel therewith and the adjacent leg consisting of a fixed resistor, said temperature-responsive resistor having a high negative temperature coefficient of resistance with the temperature-resistance curve thereof generally hyperbolic in form and the resistances of said shunt resistor and said fixed resistor being so chosen with respect thereto that the voltage appearing at the output terminals of said bridge bears a substantially linear relation to the temperature even under conditions of substantial bridge unbalance, a device for regulating the supplying of heat, an output circuit connected to the output terminals of said bridge and to said regulating device for causing the temperature to be correctively regulated to a predetermined control point, and means including a variable resistor in said output circuit and independent of the legs of said bridge circuit for adjusting the control point.

16. In a temperature-responsive device, the subcombination which comprises a bridge circuit of the Wheatstone type having four legs and a pair of output terminals, one of said legs including a temperature-responsive resistor having a shunt resistor in parallel therewith and the adjacent leg consisting of a fixed resistor, said temperature-responsive resistor having a high negative temperature coefficient of resistance with the temperature-resistance curve thereof generally hyperbolic in form and the resistances of said shunt resistor and said fixed resistor being so chosen with respect thereto that the voltage appearing at the output terminals of said bridge bears a substantially linear relation to the temperature to which the temperature-responsive resistor is subjected even under conditions of substantial bridge unbalance, and voltage responsive means connected to the output terminals of the bridge for responding in direct accordance with the magnitude of the temperature.

DONALD L. HALL.

REFERENCES CITED

The following references are of record in the file of this patent:

UNITED STATES PATENTS

| Number | Name | Date |
| --- | --- | --- |
| 2,135,513 | Holven | Nov. 8, 1938 |
| 2,250,899 | Young | July 29, 1941 |
| 2,290,091 | Brown et al. | July 14, 1942 |
| 2,325,094 | Ashworth | July 27, 1943 |
| 2,394,061 | Horstkotte | Feb. 5, 1946 |
| 2,471,457 | Shepard | May 31, 1949 |